April 7, 1942.　　　G. P. HOFF　　　2,278,878
METHOD FOR DELUSTERING AND PIGMENTING
Filed Sept. 10, 1940
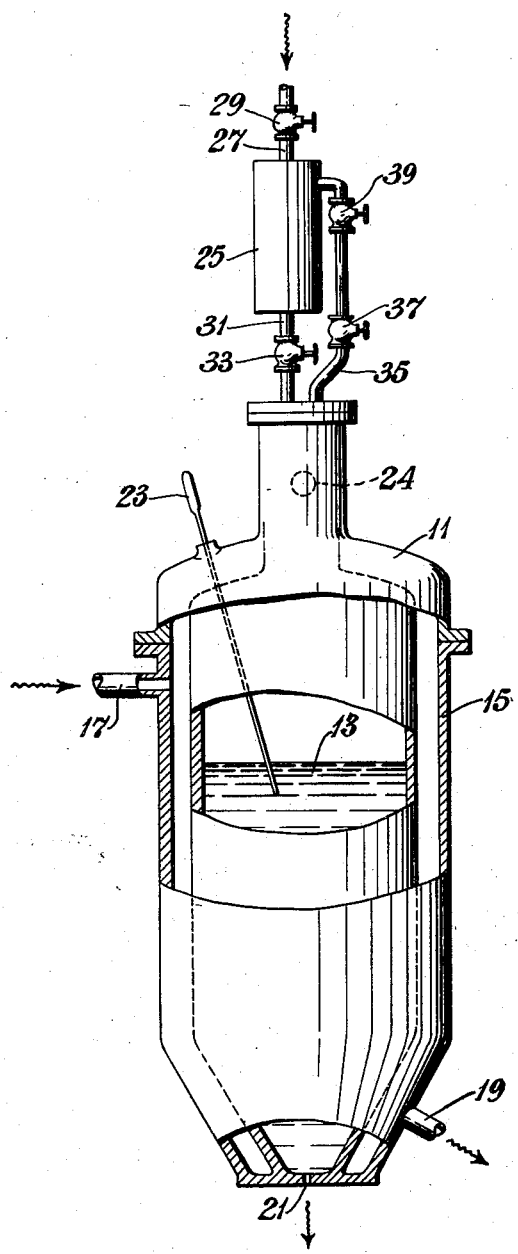
*George Preston Hoff* INVENTOR
BY *Louis A. Wiebe*
ATTORNEY Patented Apr. 7, 1942

2,278,878

UNITED STATES PATENT OFFICE 2,278,878

METHOD FOR DELUSTERING AND PIGMENTING

George Preston Hoff, Wilmington, Del., assignor to E. I. du Pont de Nemours & Company, Wilmington, Del., a corporation of Delaware Application September 10, 1940, Serial No. 356,168

3 Claims. (Cl. 260—37)

This invention relates to the delustering or pigmenting of synthetic linear polymers, particularly synthetic linear fiber-forming polymers and polyamides such as disclosed in Carothers U. S. Patents Nos. 2,071,250, and 2,130,948. More particularly, the invention relates to an improved method for the delustering or pigmenting of synthetic linear polymers by introducing the delusterant or pigment into the partially polymerized materials at a critical time as hereinafter more particularly described. The term "synthetic linear polyamide" is used throughout the specification and claims to specifically designate the type of material disclosed in U. S. Patent No. 2,130,948.

It is impractical to deluster or pigment synthetic linear polymers by introducing the delusterant immediately prior to extrusion; for these materials are more conveniently melt spun and it is extremely difficult to introduce the delusterant into the viscous molten polymer in a finely-divided and uniformly distributed condition. Resort has, therefore been made to the incorporation of finely divided inert materials such as delustering or pigmenting agents, for example, titanium dioxide, into the monomeric ingredients; for example, an aqueous solution of the salt produced by the reaction of a diamine with a dibasic acid. The titanium dioxide has been prepared as a stable aqueous dispersion and mixed with this salt solution prior to its introduction into the polymerizing autoclave. This mixture was maintained mechanically agitated until it had been pumped into the autoclave. This method had the disadvantage that the polymer sometimes had streaks of $TiO_2$.

It is, therefore, an object of the present invention to furnish an improved method for uniformly delustering or pigmenting synthetic linear polymers, such as polyamides, for example, polyhexamethylene adipamide, without mechanical agitation.

Other objects of the invention will hereinafter become apparent.

The objects of the invention may be accomplished by charging a dispersion of a delusterant into the polymerizing mass in a polymerizing autoclave after the polymerization has definitely begun but before the polymerization reaction has been completed. Preferably, the dispersion of finely divided inert material is mixed with the polymerizing mass within the period after polymerization has proceeded to a point of ebullition of the mass but before the polymerizing mass has a marked increase in viscosity.

The nature of the invention will become more clearly apparent from the drawing taken in conjunction with the following detailed description of it.

Figure 1 is a side elevational view, with parts shown in section, of a polymerizing autoclave and a charging lock by means of which a delusterant is introduced into the autoclave at the proper time as hereinafter more particularly described.

Referring to the drawing, reference numeral 11 designates an autoclave suitable for use in the polymerization of synthetic linear polymers. The polymerization mass is designated by reference numeral 13. The autoclave is provided with a heating jacket 15, the heating jacket being provided with an inlet 17 and an outlet 19 for the passage of a heating medium such as steam or Dowtherm vapors. The autoclave may be provided with an opening slot 21 in the bottom thereof, through which the polymer may be extruded in the form of a ribbon or rod for further use. Obviously, means (not shown) will be provided for closing the extrusion slot 21 during the polymerization reaction. The autoclave is provided with a thermocouple 23 for measurement of the temperature of the reaction mass. The autoclave will also, preferably, be provided with conduit means, generally represented by numeral 24, for the passage of nitrogen gas into the reaction mass for the purpose of removing all air therefrom.

In accordance with the present invention, the autoclave is provided with a charging lock 25. The charging lock will serve to inject the finely divided inert material, such as a delusterant or a pigment, into the polymerization mass during the polymerization reaction. A conduit 27 is connected to the charging lock for the purpose of passing a slurry of the finely divided material into the lock. A shut-off valve 29 is provided in conduit 27. An outlet conduit 31 from the lock 27 is connected to the autoclave. The conduit 31 is provided with a shut-off valve 33. A pressure equalization conduit 35 is connected between the autoclave and the top of the charging lock. The conduit 35 is preferably provided with two valves 37 and 39, to insure against leakage of gas from the autoclave.

The operation of the apparatus will be substantially as follows:

The reactants for the formation of the synthetic linear polymer, or a monomeric form of the polymer, are inserted into the autoclave through a suitable opening not shown in the drawing. Nitrogen gas will be passed into the autoclave through conduit 24, and if desired, the autoclave may be alternately evacuated and charged with nitrogen gas until all air is removed therefrom. The autoclave will then be heated to the desired temperature by passage of a heating medium through the heating jacket 15. The charging lock 25 will be substantially filled with a slurry of a finely divided material which is desired to be incorporated in the reaction mass. The charging lock will be filled while valves 33, 37, and 39 remain closed. After the charging lock is filled valve 29 is closed and valves 33, 37, and 39 opened, thereby equalizing the pressure in the autoclave and at the top of the charging lock and causing the passage of the slurry from the charging lock into the autoclave. Valves 33, 37, and 39 are then closed and the polymerization reaction proceeded with until completed.

The following example is given to make the invention more clearly apparent. It is to be understood that the details set forth in the example are not considered to be limitative of the invention.

*Example I*

A solution comprising 306 lbs. of hexamethylene diammonium adipate, 204 lbs. distilled water, and 1.05 lbs. of acetic acid was prepared in a solution kettle and pumped into the autoclave 11. The autoclave was purged of air, filled with nitrogen at atmospheric pressure, and heated until the temperature reached approximately 212° C. and approximately 250 lbs. per sq. in. pressure. In the meantime a slurry comprising 45 grams of $TiO_2$ and 315 grams of water was introduced into the $TiO_2$ charging lock 25 and sufficient water added to displace the air from the lock. When the temperature in the autoclave reached 212° C. and the pressure 250 lbs. per sq. in., bleeding off of water vapor was begun. Then valve 29 was closed, valves 37, 39, and 33 were opened in the order stated. The pressure above and below the charge of $TiO_2$ slurry in the lock having become equalized, the charge of slurry dropped into the autoclave. Steam continued to pass up into the lock through valves 37 and 39, condensed in the lock and washed the remnants of $TiO_2$ into the autoclave. The valves 33, 37, and 39 were closed and heating of the mixture in the autoclave was continued while maintaining the pressure at 250 lbs. per sq. in. When the temperature in the autoclave reached 275° C., reduction of the pressure was started. The pressure was reduced at a rate of 25 to 30 lbs. per sq. in. every ten minutes until atmospheric pressure was reached, all the while maintaining the temperature of the polymer at about 270-275° C. After standing in the autoclave at atmospheric pressure and about 275° C. for approximately 1 hour, the polymer was extruded as a ribbon, cooled with sprays of water, cut, dried, and blended. Samples of the extruded polymer taken at the beginning of extrusion showed by ash analysis that the polymer contained 0.30%, by weight, of $TiO_2$; samples about the middle of the extrusion had 0.30% $TiO_2$; and samples at the end of the extrusion had 0.28% $TiO_2$. The titanium dioxide delusterant was more uniformly distributed in the polymer by this procedure than by the process of mixing the $TiO_2$ slurry with the salt solution before pumping it into the autoclave.

In accordance with the present invention, it is essential that the finely divided inert material be added to the polymerization mass in the autoclave after the polymerization has definitely begun but before the polymerization reaction has been completed.

In order to obtain the best results it is preferred that the finely divided material be incorporated in the polymerization mass after the polymerization has proceeded to a point where definite ebullition of the mass takes place but before the polymerization mass exhibits a marked increase in viscosity.

For the purpose of illustration, reference is made hereinafter to the specific preferred steps in the addition of finely divided $TiO_2$ delusterant to the polymerization mass during the polymerization for the production of polyhexamethylene adipamide. In this case, the $TiO_2$ slurry is preferably added to the reaction mass when the temperature thereof reaches approximately 212° C. and the pressure 250 pounds per sq. in. Particularly good results will be obtained if the $TiO_2$ is added to the reaction mass when the autoclave temperature is between 210° C. and 215° C. Satisfactory results will be obtained if the $TiO_2$ is introduced into the reaction mass when the autoclave temperature is between 215° C. and 225° C. If the $TiO_2$ is added to the reaction mass which is being polymerized for the formation of polyhexamethylene adipamide at temperatures above 225° C. unsatisfactory results will be obtained, since the polymerization will have progressed to such an extent that the mixture is very viscous. It is still less desirable to add the $TiO_2$ slurry before the temperature reaches 210° C. and the pressure 250 pounds per sq. in. since below this temperature and pressure the mixture is not in an active state of agitation (ebullition) and the $TiO_2$ has a greater opportunity to flocculate, after which it is very difficult to disperse the same in the mass.

It is to be understood that the conditions of temperature, pressure, and time given above are the preferred conditions for the preparation of polyhexamethylene adipamide polymer and that the conditions will be different for the preparation of other delustered polymers. It is also to be understood that other polymers, such as other synthetic linear polyamides, synthetic linear polyesters, polyethers, polyacetals, various interpolymers of such synthetic linear polymers, and other synthetic linear polymers such as may be produced by condensation reactions involving the splitting out of small molecules, such as molecules of water, may be delustered or pigmented in accordance with the principle of this invention. Solutions of other percentage concentrations of the polymer-forming ingredients may be used. Also, since it is possible to deluster other polymers in this way, it is not necessary to start with a salt solution as described in the example.

Although the invention has been discussed with particular reference to $TiO_2$ as the delustering agent, it is to be understood that other pigments, both organic and inorganic, may be introduced into polymers in accordance with the present invention. The pigments may be added for the purpose of delustering or for the purpose of coloring or pigmenting the polymers. When pigments or delusterants constitute the finely divided inert material which is to be incorporated in the polymers, it is, of course, preferred that they be extremely finely divided, for example, of the order of less than 5 microns in diameter. Other finely divided inert materials may, of course, be similarly incorporated in synthetic linear polymers.

It is also obvious that other means than a charging lock may be used for introducing the slurry of finely divided material into the polymerization mass; for example, a pump, such as a hydraulic pump, or a blowcase, or other means may be employed for introducing the delusterant or pigment into the mass. The polymerization reaction may be carried out with the addition of other materials to the reactants in the production of modified synthetic linear polymers or synthetic linear polyamides without interfering with the utility of the present invention.

The present invention makes possible more uniformly delustered polymers and products produced therefrom. As a result of such greater uniformity of distribution of the particles of delusterant, yarns produced from such delustered polymers have greater and more uniform tenacity and other physical characteristics. Also, the quantity of the delustering agent required for such polymers is decreased and the cost of production is correspondingly decreased because of the better distribution of the delusterant in the polymers. Dyeing properties are also improved.

Since the salt solution of a synthetic linear polyamide itself is relatively viscous and since it becomes progressively more viscous as polymerization proceeds in the autoclave, it was unobvious that the $TiO_2$ slurry could be added without mechanical stirring after polymerization had started and still obtain good distribution of the $TiO_2$ in the polymer. Furthermore, it was surprising that the polymer produced by adding the $TiO_2$ after polymerization had started had the $TiO_2$ more uniformly distributed in it than when the $TiO_2$ was thoroughly stirred into the salt solution by mechanical agitation.

Since it is evident that many changes and modifications can be made in the above-described details without departing from the nature and spirit of the invention, it is to be understood that the invention is not to be limited to the details set forth, except as set forth in the appended claims.

I claim:

1. The method of incorporating a finely divided inert material with uniformity throughout a synthetic linear polymer taken from the class capable of being drawn from the polymer in liquid form into filaments which are further capable of being cold drawn at ordinary temperature with simultaneous increase in strength, pliability and elasticity which comprises adding such finely divided inert material to the partially polymerized polymer, during the polymerization thereof, the addition being made after the polymerization reaction has proceeded to a point of ebullition but before any marked increase in the viscosity of the reaction mass.

2. The method as defined in claim 1 in which the synthetic linear polymer is a synthetic linear polyamide.

3. The method as defined in claim 1 in which the synthetic linear polymer is polyhexamethylene adipamide.

GEORGE PRESTON HOFF.